United States Patent
Lucas et al.

(10) Patent No.: US 8,899,533 B2
(45) Date of Patent: Dec. 2, 2014

(54) VEHICLE HYDRAULIC BRAKE HOSE ASSEMBLY

(71) Applicant: Honda Motor Co., Ltd., Tokyo (JP)

(72) Inventors: Michael D. Lucas, Plain City, OH (US); Jeffrey D. Platt, Dublin, OH (US); Peter M. Schupska, Plain City, OH (US); Kirk S. Rhoades, Marysville, OH (US); Brian Doorlag, Union City, CA (US)

(73) Assignee: Honda Motor Co., Ltd., Tokyo (JP)

( * ) Notice: Subject to any disclaimer, the term of this patent is extended or adjusted under 35 U.S.C. 154(b) by 137 days.

(21) Appl. No.: 13/743,321

(22) Filed: Jan. 16, 2013

(65) Prior Publication Data

US 2014/0197285 A1    Jul. 17, 2014

(51) Int. Cl.
*F16L 3/08*       (2006.01)
*B60T 17/04*      (2006.01)
*B60B 27/00*      (2006.01)

(52) U.S. Cl.
CPC ............... B60T 17/046 (2013.01); *B60B 27/00* (2013.01); *B60G 2206/50* (2013.01)
USPC ................. 248/75; 248/56; 248/65; 138/106; 138/107; 138/109

(58) Field of Classification Search
CPC ............. B60T 17/046; F16L 3/01; F16L 3/12
USPC ......... 248/75, 65, 62, 74.1, 56; 138/106, 107, 138/109
See application file for complete search history.

(56) References Cited

U.S. PATENT DOCUMENTS

| | | | |
|---|---|---|---|
| 3,851,672 A | | 12/1974 | De Vincent et al. |
| 3,853,148 A | * | 12/1974 | De Vincent et al. .......... 138/110 |
| 4,340,244 A | * | 7/1982 | Scott ................................ 285/8 |
| 4,346,863 A | * | 8/1982 | Zeitrager et al. ............... 248/75 |
| 4,601,448 A | * | 7/1986 | Miyazaki et al. .............. 248/56 |
| 4,998,692 A | | 3/1991 | Shigeki et al. |
| 6,095,462 A | * | 8/2000 | Morgan ......................... 248/82 |
| 6,409,223 B1 | * | 6/2002 | Bartholoma .................. 285/114 |
| 6,769,652 B1 | | 8/2004 | Capan et al. |
| 6,830,075 B1 | * | 12/2004 | McKinney et al. .......... 138/106 |

FOREIGN PATENT DOCUMENTS

| | | |
|---|---|---|
| JP | 2028048 | 1/1990 |
| JP | 5296375 | 11/1993 |
| JP | 2000/108885 | 4/2000 |

* cited by examiner

*Primary Examiner* — Anita M King
(74) *Attorney, Agent, or Firm* — Rankin, Hill & Clark LLP

(57) ABSTRACT

A hydraulic brake hose assembly includes a suspension component, a brake hose connected to the suspension component, and a support bracket connected to the brake hose and the suspension component. The support bracket includes a base having a forward edge portion, a rear edge portion and opposite side edge portions. A forward wall extends upwardly from the forward edge portion. A sidewall extends upwardly from one of the side edge portions. A single mounting opening is located on the base. An anti-rotation tab extends downwardly from the base. The suspension component includes a portion having a mounting aperture and a recess respectively corresponding with the single mounting opening and the anti-rotation tab of the support bracket. The support bracket prevents rotation of the brake hose relative to the support bracket as the support bracket is secured to the portion of the suspension component via a single fastener.

19 Claims, 4 Drawing Sheets

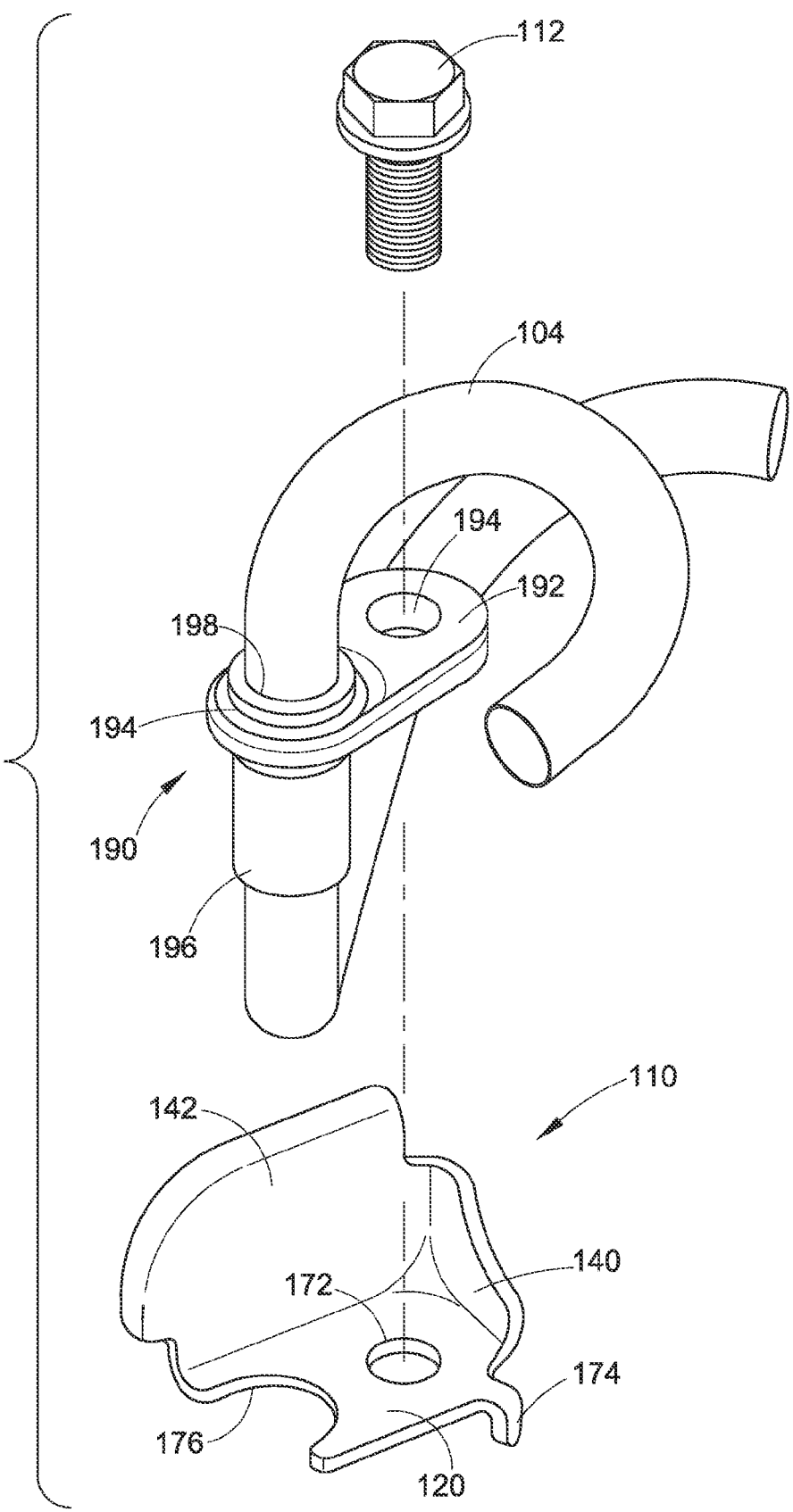

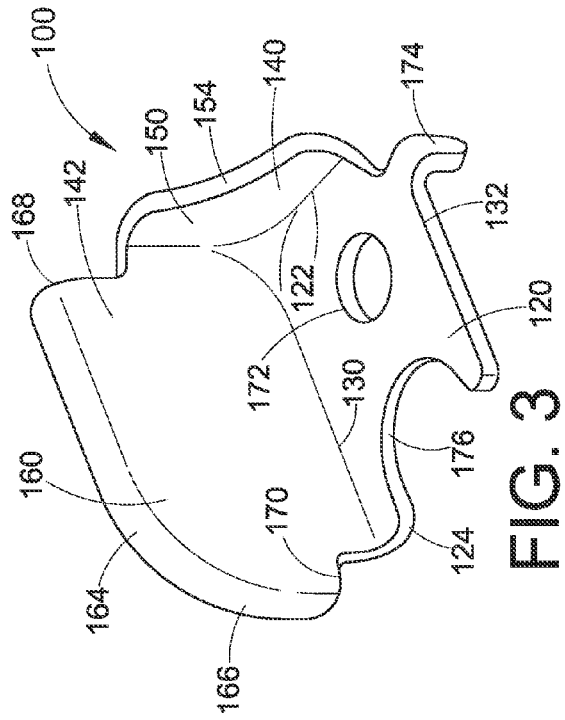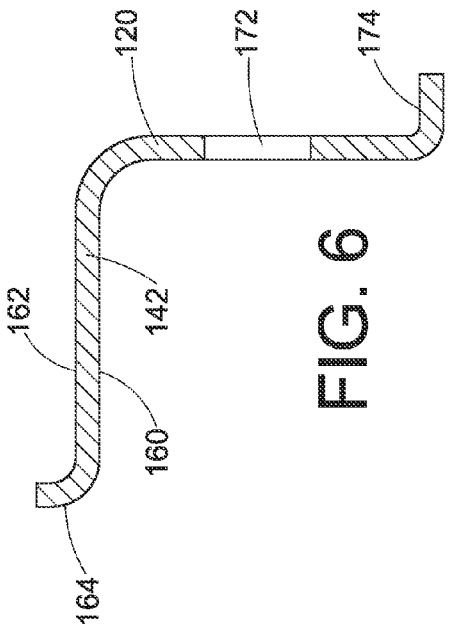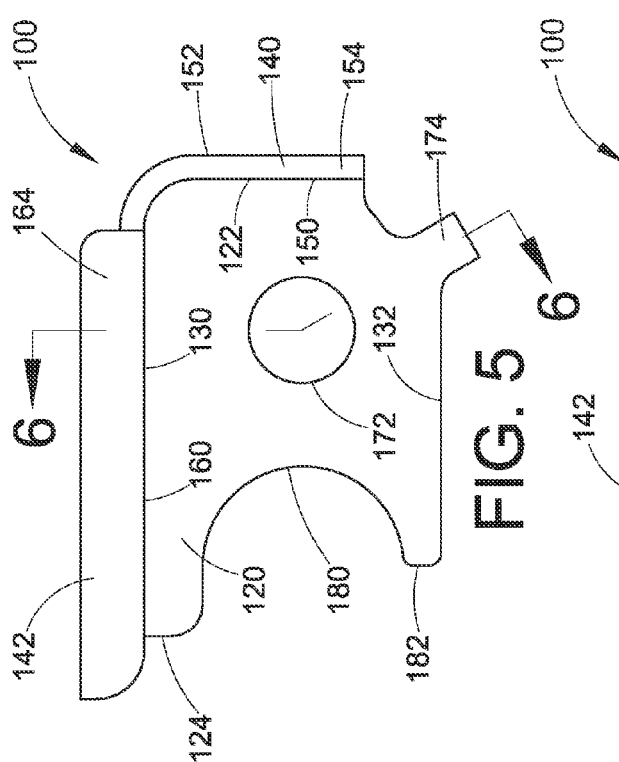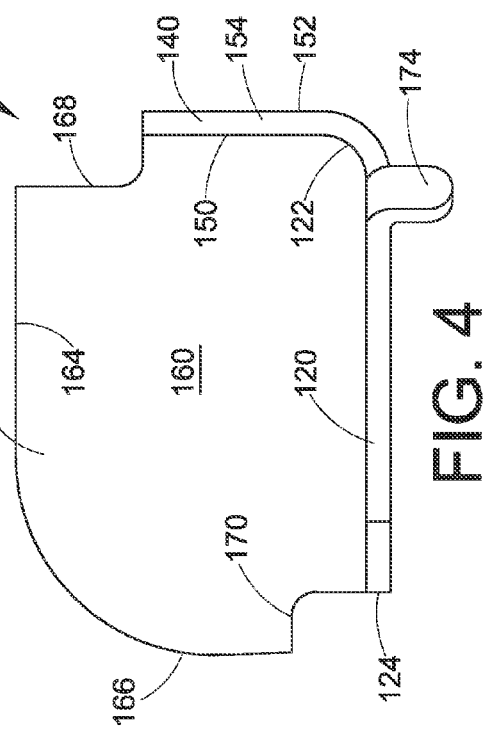

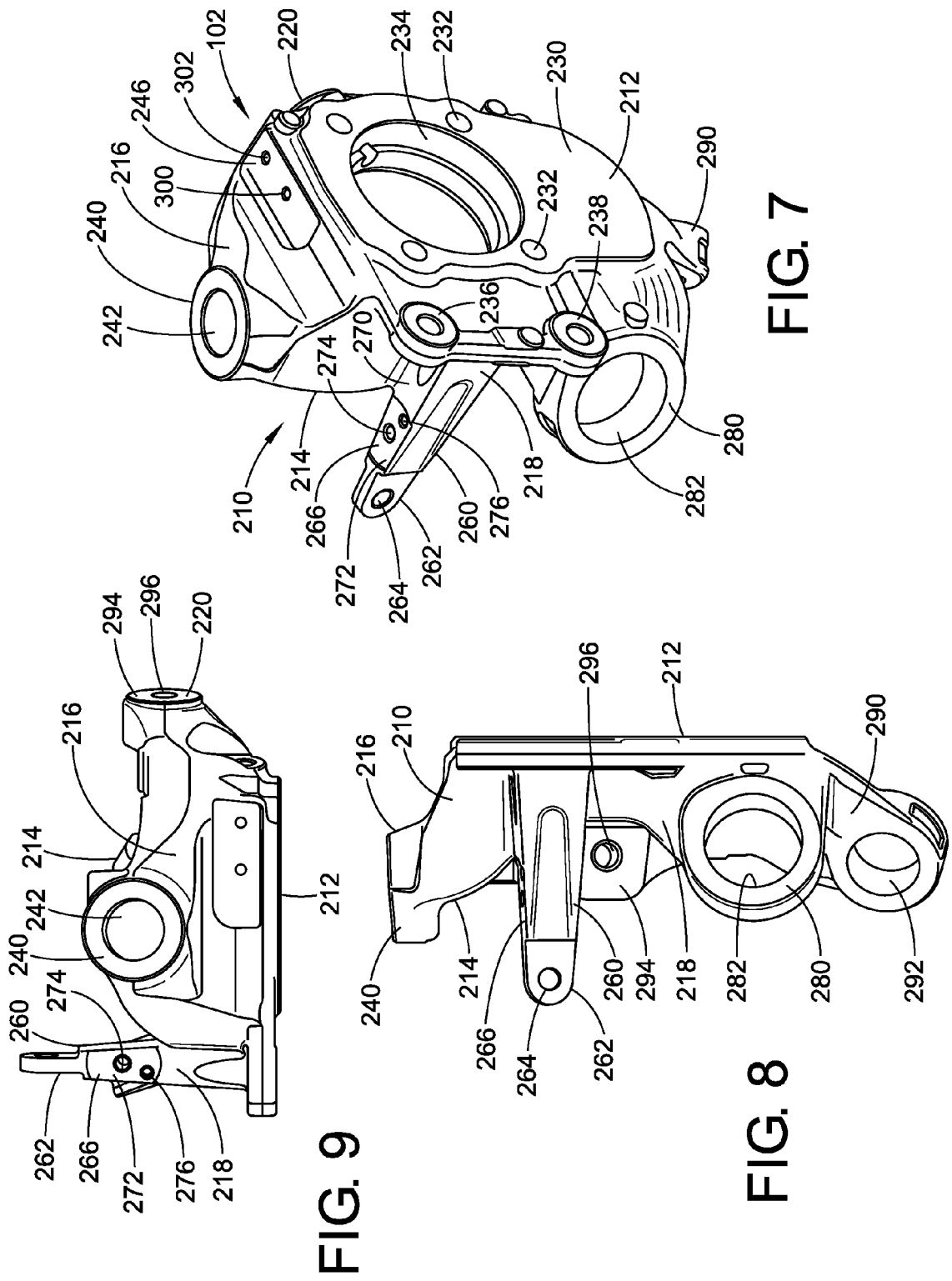

VEHICLE HYDRAULIC BRAKE HOSE ASSEMBLY

BACKGROUND

Exemplary embodiments herein generally relate to a vehicle hydraulic brake hose assembly, and, more particularly, to a vehicle hydraulic brake hose assembly including a support bracket for mounting a flexible hydraulic brake hose to a suspension component, the support bracket being configured to prevent co-rotation of the brake hose with a single mounting.

In order to accommodate necessary relative motion between the sprung and unsprung masses of a motor vehicle (i.e., the chassis and suspended wheels), suspension mounted hydraulic brakes are connected to the chassis by flexible hydraulic brake hoses. In various applications where the flexible brake hoses are used to convey hydraulic brake fluid to the individual wheel brakes of the vehicle, it is necessary to bend and route the hydraulic brake hoses around various structural or frame parts of the vehicle. For example, in some vehicles, each brake hose requires accurate routing from the disc brake caliper of the vehicle wheel assembly to a fixed element of the vehicle body to insure proper clearance between the brake hose and other components of the vehicle. Typically, this routing of the hydraulic brake hose has been affected by the use of a brake hose support bracket adapted to be fixed to a vehicle part, such as a suspension component.

There are several common ways of affixing a brake hose to a suspension component by means of a brake hose support bracket. Typically, the variation is the mounting of the support bracket to the suspension component. One known method for affixing a brake hose to a suspension component, such as a damper, is to weld the support bracket to that component. A single bolt is then used to connect the brake hose to the bracket. The welding prevents the support bracket from moving or rotating when the brake hose is being connected to the bracket. Another known method for affixing a brake hose to a suspension component, such as a knuckle, is to bolt a support bracket to that component using a pair of fasteners. Then, another fastener is used to connect the brake hose to the support bracket. The pair of fasteners prevents the bracket from moving or rotating when the brake hose is being connected to the bracket. In order to secure the brake hose, a fixing point is needed on a portion of the suspension component. For example, as it relates to a knuckle, the manufacturing process of the knuckle prevents the brake hose from being mounted directly to the knuckle, so the support bracket is necessary. Because the knuckle is formed of aluminum and the support bracket is formed of steel, welding is not an option for connecting the support bracket to the knuckle. The known method of bolting described above requires generally large fastener holes or, for other arrangements, three smaller holes or the addition of a weld-nut to the support bracket.

BRIEF DESCRIPTION

In accordance with one aspect, a hydraulic brake hose assembly for a vehicle comprises a suspension component, a flexible hydraulic brake hose connected to the suspension component, and a support bracket connected to the brake hose and the suspension component for affixing the brake hose to the suspension component. The support bracket includes a base having a forward edge portion, a rear edge portion and opposite side edge portions. A forward wall extends upwardly from the forward edge portion. A sidewall extends upwardly from one of the side edge portions. A single mounting opening located on the base receives a single associated fastener for securing the support bracket to the suspension component. An anti-rotation tab extends downwardly from one of the forward edge portion and the other side edge portion of the base. The suspension component includes a portion configured to mate with the base of the support bracket. The portion includes a mounting aperture and a recess respectively corresponding with the single mounting opening and the anti-rotation tab of the support bracket. The support bracket prevents rotation of the brake hose relative to the support bracket as the support bracket is secured to the portion of the suspension component via the single associated fastener.

In accordance with another aspect, a hydraulic brake hose assembly for a vehicle comprises a suspension knuckle, a flexible hydraulic brake hose, a brake hose joint mounted to the brake hose, and a support bracket connected to the brake hose joint and the knuckle for affixing the brake hose to the knuckle. The support bracket includes a base, a forward wall and a sidewall each extending perpendicularly from the base. A single mounting opening is located on the base for receiving a single associated fastener for securing the support bracket and the brake hose joint to the knuckle. An anti-rotation tab extends downwardly from the base. The knuckle includes a rearwardly extending arm having a portion configured to mate with the base of the support bracket. The portion includes a mounting aperture corresponding with the single mounting opening of the support bracket and an aperture of the brake hose joint and a recess corresponding with the anti-rotation tab of the support bracket. The support bracket and brake hose joint are fixedly secured to the portion of the knuckle only via the single associated fastener. The support bracket prevents rotation of the brake hose relative to the support bracket as the support bracket and joint are secured to the portion of the knuckle via the single associated fastener.

In accordance with yet another aspect, a method of securing a vehicle hydraulic brake hose to a suspension knuckle is provided. The method comprises providing a planar mounting surface on a portion of the knuckle; mounting a brake hose joint on the brake hose; positioning a support bracket on the mounting surface; positioning the brake hose joint on the support bracket in a manner that the brake hose joint is prevented from rotating relative to the support bracket in at least one direction; and securing both the brake hose joint and the support bracket to the mounting surface of the knuckle via a single fastener.

BRIEF DESCRIPTION OF THE DRAWINGS

FIG. 2 is a partial exploded view of the assembly of FIG. 1.

FIG. 3 is a perspective view of the support bracket of FIG. 1.

FIG. 4 is a front view of the support bracket of FIG. 3.

FIG. 5 is a top view of the support bracket of FIG. 3.

FIG. 6 is a cross-sectional view of the support bracket of FIG. 5 taken along line 6-6 of FIG. 5.

FIG. 7 is a perspective view of the suspension component of FIG. 1.

FIG. 8 is a side view of the suspension component of FIG. 7.

FIG. 9 is a top view of the suspension component of FIG. 7.

DETAILED DESCRIPTION

Figure 1:
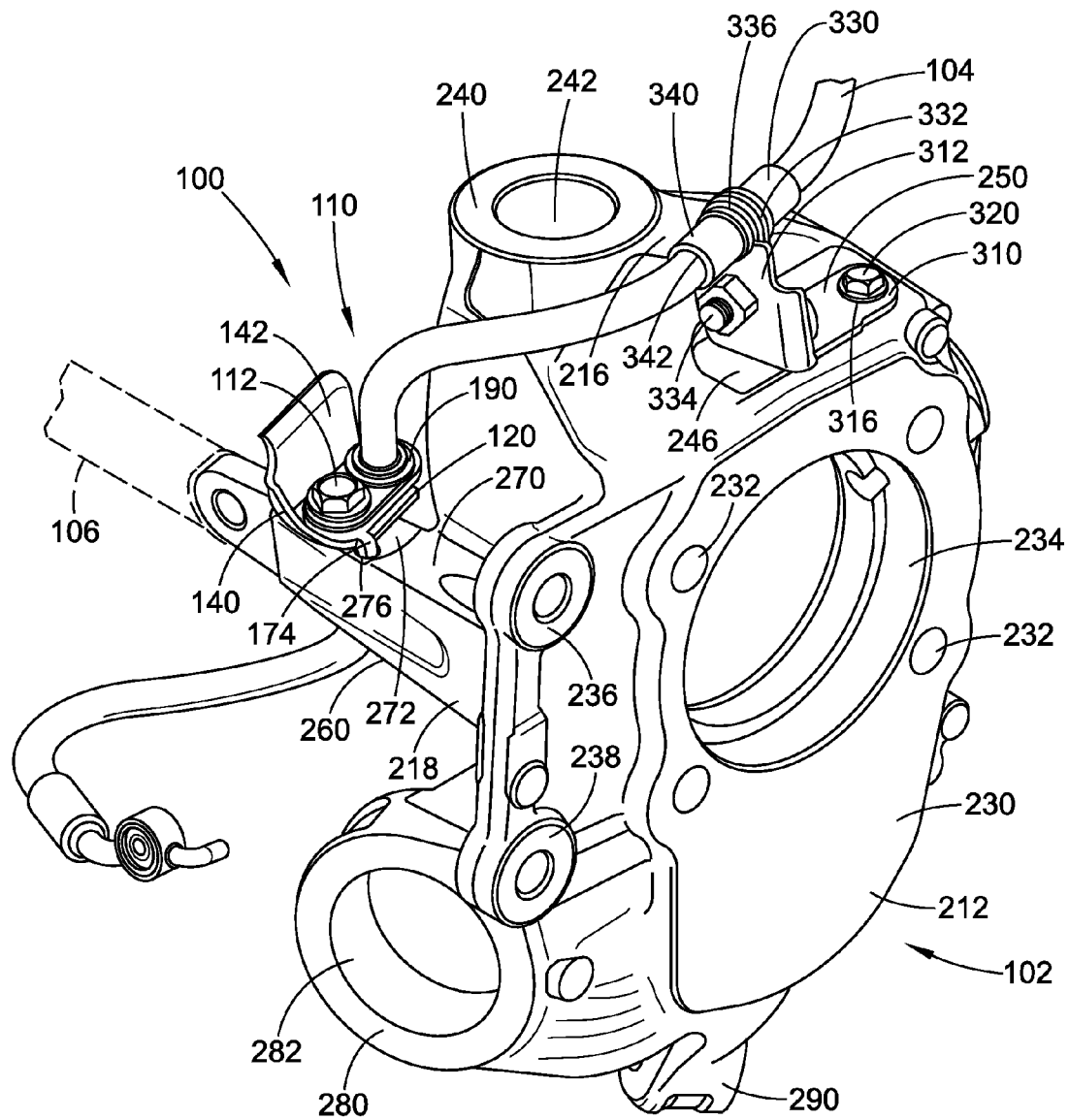
FIG. 1 is a perspective view of a hydraulic brake hose assembly for a vehicle according to the present disclosure, the assembly including a suspension component, a flexible hydraulic brake hose, and a support bracket.

It should, of course, be understood that the description and drawings herein are merely illustrative and that various modifications and changes can be made in the structures disclosed without departing from the present disclosure. In general, the figures of the exemplary vehicle hydraulic brake hose assembly are not to scale. It will also be appreciated that the various identified components of the exemplary vehicle hydraulic brake hose assembly disclosed herein are merely terms of art that may vary from one manufacturer to another and should not be deemed to limit the present disclosure.

Referring now to the drawings, wherein like numerals refer to like parts throughout the several views, FIGS. 1 and 2 illustrate a hydraulic brake hose assembly 100 for a vehicle. The brake hose assembly 100 is associated with a suspension component of a vehicle suspension system, such as the depicted knuckle 102, and comprises a flexible hydraulic brake hose 104 connected to the suspension component 102, and a support bracket 110 connected to the brake hose 104 and the suspension component 102 for affixing the brake hose to the suspension component. It should be appreciated that the hydraulic brake hose 104 can be made of any suitable material for automotive applications. As is well known, the suspension system typically includes an upper control arm (not shown), a lower control arm (not shown), and a stabilizer bar (shown in dashed lines at 106), each being connected to the knuckle 102. Because of the movement of the suspension system during vehicle operation, hydraulic fluid from the braking system (not shown) of the vehicle must be supplied to a brake assembly (not shown) through the brake hose assembly 100. As will be described below, the support bracket 110 prevents rotation of the hydraulic brake hose 104 relative to the support bracket 110 as the support bracket 110 is secured to the suspension component 102 via a single fastener, such as the depicted bolt 112.

With reference to FIGS. 3-6, the support bracket 110 includes a planar base 120 having a forward edge portion 122, a rear edge portion 124 and opposite side edge portions 130, 132. A forward wall 140 extends upwardly and perpendicularly from the forward edge portion 122. A sidewall 142 extends upwardly and perpendicularly from one of the side edge portions, specifically side edge portion 130. As shown, the forward wall 140 includes a front surface 150, a rear surface 152 and an upper surface 154. The upper surface 154 is inclined upwardly toward the sidewall 142 thereby providing for a low profile of the support bracket 110 when secured to the suspension component 102. The sidewall 142 has a height greater than a height of the forward wall 140 (as measured from the base 120) and includes a front surface 160 and a rear surface 162. An upper portion 164 of the sidewall 142 is curved away from the base 120 and defines an upper surface, and a side portion 166 of the sidewall is curved away from the forward wall 140 and defines side surface. The side surface can be arcuate shaped; although, this is not required. The sidewall 142 further includes a first inwardly extending cutout 168 which defines a transition from the sidewall 142 to the forward wall 140, and a second inwardly extending cutout 170 which defines a transition from the sidewall 142 to the rear edge portion 124 of the base 120. It should be appreciated that the sidewall 142 is a hose protection feature designed to protect or shield the brake hose 104 from a broken stabilizer bar/link. The broken stabilizer bar/link will contact the sidewall 142 before contact occurs to the brake hose 104, thereby protecting the brake hose from contact/damage.

A single mounting opening 172 is located on the base 120 and is dimensioned to receive the single fastener 112 for securing the support bracket 110 to the suspension component 102 (see FIGS. 1 and 2). An anti-rotation tab 174 extends downwardly from one of the forward edge portion 122 and the other side edge portion 132 of the base 120. As depicted, the anti-rotation tab projects from the side edge portion 132 and is positioned adjacent the forward edge portion 122. The rear edge portion 124 of the base 120 further includes an inwardly extending cutout 176. The cutout 176 includes a first arcuate shaped portion 180 and a second portion 182 which spans between the first portion 180 and the side edge portion 132.

With reference back to FIG. 2, the brake hose assembly 100 further comprises a brake hose joint 190 connected to the hydraulic brake hose 104 and configured to mount the brake hose 104 to the support bracket 110. The brake hose joint 190 includes a base member 192 having a first opening 194 corresponding with the mounting opening 172 of the support bracket 110 for receiving the single fastener 112. A second opening 194 is also provided on the base member 192 and is dimensioned to receive the brake hose 104. An elongated stem 196 is positioned in the second opening 194 and extends downwardly from the base member 192. The stem 196 includes a bore 198 extending axially therethrough and aligned with the second opening 194. The bore 198 of the stem 196 is dimensioned to receive a portion of the brake hose 104. The brake hose joint 190 is sized such that an outer periphery of the base member 192 is substantially confined on the base 120 of the support bracket 110. As will be discussed below, at least one of the forward wall 140 and side wall 142 is configured to prevent rotation of the brake hose joint 190 relative to the bracket 110 as the joint together with the bracket is secured to the portion of the knuckle.

The suspension component (i.e., knuckle 102) with be described with reference to FIGS. 7-9. The suspension component 102 includes a body 210 having a forward portion 212, a rear portion 214, a top portion 216 and opposite side portions portion 218, 220. The forward portion 212 includes a bearing mount surface 230 having a plurality of mounting apertures 232 which surround a through opening 234 for the mounting of a wheel attachment unit (not shown) to the knuckle 102. As is well known, the wheel attachment unit is attached to a wheel rim (not shown). Brake caliper mounting pads 236, 238 are also provided on the forward portion 212. The top portion 216 includes an upper arm support 240 including a mounting aperture 242. The mounting aperture is dimensioned to receive a bushing joint (not shown) for connecting the upper arm support (not shown) to the knuckle 102. The top portion 216 further includes a mounting surface 246 for a secondary brake hose support bracket 250 (FIG. 1). The side portion 218 of the knuckle 102 includes a rearwardly extending arm 260 having a distal end portion 262 having an opening 264 for connection to the stabilizer bar 106.

The rearwardly extending arm 260 further includes a portion 266 configured to mate with the base 120 of the support bracket 110. The portion 266 is defined by a cutout or recess located in an upper surface 270 of the arm 260 and includes a planar mounting surface 272. Located on the mounting surface 272 are a mounting aperture 274 and a recess 276 having a spatial orientation corresponding with the respective single mounting opening 172 and anti-rotation tab 174 of the support bracket 110. The side portion 218 further includes a lower arm support 280 including a mounting aperture 282 for a bushing joint (not shown) for connecting the lower arm support (not shown) to the knuckle 102. The side portion 220 also includes a lower arm support 290 including a mounting aperture 292 for a bushing joint (not shown) for connecting another lower arm support (not shown) to the knuckle 102. A second support 294 including a mounting aperture 296 is also provided on the side portion 220.

As indicated above, the top portion 216 of the knuckle 102 includes the mounting surface 246 for connecting the secondary brake hose support bracket 250 to the knuckle 102 (FIG.

1). The mounting surface 246 is defined by a cutout or recess in the top portion 216 and includes a pair of spaced mounting apertures 300, 302. As shown in FIG. 1, the secondary brake hose support bracket 250 comprises a planar base 310 and a forward wall 312 extending upwardly from a forward edge portion of the base 310. A pair of spaced mounting openings (only mounting opening 316 farthest from the forward wall 312 is visible) is located on the base 310 and are dimensioned to receive fasteners 320 for securing the secondary support bracket 250 to the suspension component 102. A secondary brake hose joint 330 is connected to the brake hose 104 and configured to mount the brake hose 104 to the secondary support bracket 250. The secondary brake hose joint 330 includes a base member 332 having a first opening (not visible) corresponding with a mounting opening (not visible) provided on the forward wall 312 of the secondary support bracket 250. A fastener 334 extends through the first opening and mounting opening and secures the secondary brake hose joint 330 to the forward wall 312. A second opening 336 is also provided on the base member 332 and is dimensioned to receive the brake hose 104. An elongated stem 340 is positioned in the second opening 336 and includes a bore 342 extending axially therethrough and aligned with the second opening 336. The bore 342 is dimensioned to receive a portion of the brake hose 104. The secondary brake hose support bracket 250 routes the brake hose over the top portion 216 of the knuckle 102.

With reference again to FIGS. 1 and 2, by way of example only, to assemble the brake hose assembly 100, the brake hose 104 is threaded through the stem 196 of the brake hose joint 190. The support bracket 110 is positioned on the portion 266 located on the upper surface 270 of the rearwardly extending arm 260 of the knuckle 102. The mounting opening 172 of the support bracket 110 is aligned with mounting aperture 274 and the anti-rotation tab 174 is positioned in the recess 276. The base member 192 of the brake hose joint 190 is then positioned atop the base 120 such that the first opening 194 registers with the mounting opening 172 and the first portion 180 of the cutout 176 at least partially receives the stem 196, which is positioned inside of the arm 260. As shown, a depth of the cutout (which defines the portion 266) is substantially equal to a thickness of the base 120 of the support bracket 110 and an outer periphery of the base member 192 substantially corresponds with or mirrors an outer periphery of the base of the support bracket. This provides a low profile for the support bracket 110 and brake hose joint 190 on the knuckle 102. Further, the base member 192 of the brake hose joint 190 is positioned adjacent the forward wall 140 and sidewall 142 of the support bracket 110, which prevents rotation of the brake hose joint 190 relative to the support bracket 110 as the joint 190 together with the support bracket 110 is secured to the portion 266 of the suspension component 102 via the single fastener 112. The fastener 112 is threaded through the first opening 194 and mounting opening 172 and threadingly engages the mounting aperture 274 thereby mounting the support bracket 110 together with the joint 190 to the mounting surface 272 of the portion 266. As depicted in FIG. 1, the support bracket 110 routes the brake hose 104 to an interior portion of the knuckle 102.

The present disclosure further provides a method of securing the hydraulic brake hose 104 to the suspension knuckle 102. The method comprises providing the planar mounting surface 272 on the portion 266 of the knuckle 102; mounting the brake hose joint 190 on the brake hose 104; positioning the support bracket 110 on the mounting surface 272; positioning the brake hose joint 190 on the support bracket 110 in a manner that the brake hose joint 190 is prevented from rotating relative to the support bracket 110 in at least one direction; and securing both the brake hose joint 190 and the support bracket 110 to the mounting surface 272 of the knuckle 102 via the single fastener 112.

The positioning of the support bracket step further includes providing the anti-rotation tab 174 on the support bracket 110, providing the recess 276 in the mounting surface 272, and positioning the anti-rotation tab in the recess. The positioning the brake hose joint step further includes positioning the brake hose joint 190 adjacent the side wall 142 to prevent rotation of the joint during the securing step. The positioning the brake hose joint step further includes positioning the stem 196 of the brake hose joint 190 at least partially in the cutout 176 of the support bracket 110.

Further, it should be evident from the foregoing that the present assembly 100 allows the brake hose layout to be secured by providing the mounting surface 272 on the knuckle 102 to react to the torque applied to the fastener 112 and resist co-rotation of the brake hose 104. The assembly 100 secures both the brake hose 104 and the support bracket 110 with the single fastener 112. As indicated above, a portion of the brake hose 104 is received in the brake hose joint 190. The brake hose joint 190 is then connected to the support bracket 110 which is secured to the knuckle 102. The bracket 110 includes the base 120 having the cutout 176 for receiving the stem 196 of the brake hose joint 190. The anti-rotation tab 174 is aligned with the mounting opening 172 and extends downwardly from the base 120. To connect the assembly 110 to the knuckle 102, the anti-rotation tab 174 is received in the corresponding recess 276 provided on the knuckle 102 and the mounting opening 172 is aligned with the corresponding mounting aperture 274 provided on the knuckle. The fastener 112 then connects the brake hose joint 190 and the bracket 110 to the knuckle. By using the forward wall 140 and sidewall 142, the brake hose joint 190 is prevented from rotating as the fastener 112 is being tightened. By use of the single fastener, the number of parts is reduced which in turn reduces cost, weight and assembly time.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A hydraulic brake hose assembly for a vehicle, comprising:
 a suspension component;
 a flexible hydraulic brake hose connected to the suspension component; and
 a support bracket connected to the brake hose and the suspension component for affixing the brake hose to the suspension component, the support bracket including a base having a forward edge portion, a rear edge portion and opposite side edge portions, a forward wall extending upwardly from the forward edge portion, a sidewall extending upwardly from one of the side edge portions, a single mounting opening located on the base for receiving a single associated fastener for securing the support bracket to the suspension component, and an anti-rotation tab extending downwardly from one of the forward edge portion and the other side edge portion of the base,
 wherein the suspension component includes a portion configured to mate with the base of the support bracket, the portion including a mounting aperture and a recess respectively corresponding with the single mounting opening and the anti-rotation tab of the support bracket, the support bracket preventing rotation of the brake hose relative to the support bracket as the support bracket is secured to the portion of the suspension component via the single associated fastener.

2. The assembly of claim 1, further comprising a brake hose joint connected to the brake hose and configured to mount the brake hose to the support bracket, the joint including a base member having a first opening corresponding with the mounting opening of the support bracket for receiving the single associated fastener and a second opening dimensioned to receive the brake hose, and an elongated stem extending downwardly from the base member, the stem including a bore extending axially therethrough and aligned with the second opening, the bore dimensioned to receive the brake hose.

3. The assembly of claim 2, wherein the base of the support bracket includes a cutout for at least partially receiving the stem.

4. The assembly of claim 3, wherein the cutout extends inwardly from the rear edge portion of the base of the support bracket.

5. The assembly of claim 2, wherein the base member of the brake hose joint is positioned adjacent the sidewall of the support bracket, the sidewall preventing rotation of the joint relative to the bracket as the joint together with the bracket is secured to the portion of the suspension component via the single associated fastener.

6. The assembly of claim 5, wherein an outer periphery of the base member substantially corresponds with an outer periphery of the base of the support bracket.

7. The assembly of claim 1, wherein the suspension component is a knuckle, the support bracket routing the brake hose to an interior portion of the knuckle.

8. The assembly of claim 7, wherein the knuckle includes a rearwardly extending arm for connection to an associated stabilizer, the portion of the suspension component to which the support bracket is secured being located on the rearwardly extending arm.

9. The assembly of claim 8, wherein the rearwardly extending arm includes a cutout which is at least partially defined by a planar mounting surface, the mounting aperture and the recess located on the planar surface, the support bracket being mounted to the planar mounting surface.

10. The assembly of claim 9, wherein a depth of the cutout is substantially equal to a thickness of the base of the support bracket thereby providing a low profile for the support bracket on the knuckle.

11. A hydraulic brake hose assembly for a vehicle, comprising:
a suspension knuckle;
a flexible hydraulic brake hose;
a brake hose joint mounted to the brake hose; and
a support bracket connected to the brake hose joint and the knuckle for affixing the brake hose to the knuckle, the support bracket including a base, a forward wall and a sidewall each extending perpendicularly from the base, a single mounting opening located on the base for receiving a single associated fastener for securing the support bracket and the brake hose joint to the knuckle, and an anti-rotation tab extending downwardly from the base,
wherein the knuckle includes a rearwardly extending arm having a portion configured to mate with the base of the support bracket, the portion including a mounting aperture corresponding with the single mounting opening of the support bracket and an aperture of the brake hose joint and a recess corresponding with the anti-rotation tab of the support bracket, wherein the support bracket and brake hose joint are fixedly secured to the portion of the knuckle only via the single associated fastener and the support bracket prevents rotation of the brake hose relative to the support bracket as the support bracket and joint are secured to the portion of the knuckle via the single associated fastener.

12. The assembly of claim 11, wherein the brake hose joint includes a base member having the aperture and a stem extending from the base member and having a bore extending therethrough for receiving a portion of the brake hose.

13. The assembly of claim 12, wherein the base of the support bracket includes a cutout for at least partially receiving the stem of the brake hose joint.

14. The assembly of claim 11, wherein at least one of the forward wall and side wall is configured to prevent rotation of the brake hose joint relative to the bracket as the joint together with the bracket is secured to the portion of the knuckle.

15. The assembly of claim 11, wherein the rearwardly extending arm of the suspension knuckle is configured for connection to an associated stabilizer, the support bracket routing the brake hose to an interior portion of the arm.

16. The assembly of claim 11, wherein the arm includes a cutout which is at least partially defined by a planar mounting surface, the support bracket being mounted to the planar mounting surface.

17. A method of securing a vehicle hydraulic brake hose to a suspension knuckle comprising:
providing a planar mounting surface on a portion of the knuckle;
mounting a brake hose joint on the brake hose;
positioning a support bracket on the mounting surface;
positioning the brake hose joint on the support bracket in a manner that the brake hose joint is prevented from rotating relative to the support bracket in at least one direction, wherein the positioning of the support bracket step further includes providing an anti-rotation tab on the support bracket, providing a recess in the mounting surface, and positioning the anti-rotation tab in the recess; and
securing both the brake hose joint and the support bracket to the mounting surface of the knuckle via a single fastener.

18. The method of claim 17, wherein the support bracket includes an upwardly extending wall and the positioning the brake hose joint step further includes positioning the joint adjacent the wall to prevent rotation of the joint during the securing step.

19. The method of claim 18, wherein the support bracket includes a cutout and the joint includes a stem for receipt of the brake hose, and the positioning the brake hose joint step further includes positioning the stem at least partially in the cutout of the support bracket.

* * * * *